United States Patent [19]

Thompson

[11] 4,031,986
[45] June 28, 1977

[54] DISK BRAKE CONSTRUCTION HAVING STAMPED SUPPORT

[76] Inventor: Tom H. Thompson, 540 Grander View Road, Milford, Mich. 48042

[22] Filed: Sept. 18, 1975

[21] Appl. No.: 614,583

Related U.S. Application Data

[63] Continuation of Ser. No. 454,357, March 25, 1974, abandoned.

[52] U.S. Cl. .................................. 188/72.4; 92/35; 188/71.1; 188/71.8; 188/72.6; 188/73.3; 188/106 F; 188/196 P; 188/370; 192/70.25; 192/88 A; 192/111 A

[51] Int. Cl.² ........................................ F16D 55/22

[58] Field of Search .............. 188/71.1, 73.3, 72.4, 188/72.5, 370, 71.8, 196 R, 196 P, 106 F, 72.6, 79.5 GE; 192/111 A, 70.25, 88 A; 92/35

[56] References Cited

UNITED STATES PATENTS

| 2,163,033 | 6/1939 | Gosling et al. | 192/88 A |
|---|---|---|---|
| 2,894,607 | 7/1959 | Butler | 188/370 X |
| 3,134,459 | 5/1964 | Burnett et al. | 188/72.4 |
| 3,145,806 | 8/1964 | Gancel | 188/72.6 |
| 3,150,745 | 9/1964 | Eksergian | 188/72.4 X |
| 3,182,754 | 5/1965 | Hahm et al. | 188/72.4 X |
| 3,279,564 | 10/1966 | Gancel | 188/72.4 |
| 3,365,029 | 1/1968 | Swift | 188/72.6 X |
| 3,371,750 | 3/1968 | Schutte et al. | 188/72.6 X |
| 3,404,756 | 10/1968 | Swift | 188/72.6 X |
| 3,675,743 | 7/1972 | Thompson | 188/370 X |
| 3,701,399 | 10/1972 | Airheart | 188/72.6 X |
| 3,851,567 | 12/1974 | Thompson | 188/370 X |

FOREIGN PATENTS OR APPLICATIONS

| 757,895 | 5/1967 | Canada | 188/72.5 |
|---|---|---|---|
| 1,480,132 | 5/1969 | Germany | 188/71.1 |

Primary Examiner—George E. A. Halvosa
Attorney, Agent, or Firm—Reising, Ethington, Barnard, Perry & Brooks

[57] ABSTRACT

A disk brake assembly including a stamped sheet metal integral body having at least one substantially flat side wall with top and end portions projecting from the top and end edges, respectively, of the side wall. An actuator opening is formed in the side wall, and a flange projects from the periphery of the opening to define an integral sleeve. A disk brake actuator module is received in the opening and sleeve, the module including a cylindrical housing having a closed end and an open end with an actuator mounted therein and axially extendable and retractable with respect to the housing in response to fluid pressure changes in the housing. The module housing is received in the sleeve with a friction fit and is formed with a retaining flange that engages the side wall of the integral body to prevent axial movement of the housing in one direction relative to the side wall.

15 Claims, 4 Drawing Figures

DISK BRAKE CONSTRUCTION HAVING STAMPED SUPPORT

This is a continuation of application Ser. No. 454,357 filed Mar. 25, 1974 now abandoned.

This invention relates generally to vehicle brake apparatus, and is particularly concerned with the construction of disk brakes and the housing for hydraulic disc brake actuators.

In hydraulic disk brake systems for vehicles, braking pressure is applied to opposite faces of a disk mounted to rotate with a wheel of the vehicle. The braking pressure must be applied by hydraulic actuators mounted on the opposite sides of the brake disk in a stationary position, the hydraulic actuators being mounted in a housing secured to the frame or other stationary portion of the vehicle and provided with suitable hydraulic connections for transmitting hydraulic pressure to and from the actuators. The caliper, or support, is shaped and located such that a portion of the wheel mounted brake disk is received between the opposed actuators so that the actuators can apply braking pressure to the opposite faces of the rotating disk when caused to hydraulically extend from the caliper upon application of the brakes.

U.S. Pat. No. 3,851,567 discloses a bellows-type brake actuator for use in a closed hydraulic brake system, the actuator having a corrugated side wall which is inelasticaly deformable such that when the actuator is extended under pressure, the inelastic deformation of the corrugated side wall prevents the actuator from rebounding to its original length when the hydraulic pressure is removed. Consequently, brake lining wear is compensated for by the progressive increase in the relaxed length of the actuator. Other types of brake systems are available wherein the brake pads are actuated into engagement with the brake disk by pistons slidable mounted in cylinders or chambers such that when the chamber is pressurized, the piston causes the brake pad to extend into engagement with the adjacent surface of the rotating brake disc to apply braking pressure. One of the objects of the present invention is to provide a disk brake caliper or housing structure consisting of an integral body formed of stamped or forged sheet metal.

A further object is to provide a disc brake assembly including a stamped, sheet metal body having a side wall with an opening formed therein and a flange projecting from the periphery of the opening to define an integral sleeve for axially receiving a disk brake actuator module that can be removed and installed with ease and a minimum amount of skill.

In achievement of the foregoing, and other objects, the present invention is embodied in a disk brake support or caliper in the form of an integral body of stamped sheet metal which has at least one substantially flat side wall with top and end portions projecting from the edges of the side wall. The side wall is formed with an actuator opening, and a flange projects from the peripherery of the opening to define an intergral sleeve for supporting an actuator module. The module comprises a cylindrical housing having a closed end and an open end with an actuator in the form of either a bellows or piston mounted in the housing and extendable and retractable with respect to the housing in response to fluid pressure changes in the housing. The housing is received in the sleeve with a friction fit and is formed with a retaining flange which engages the side wall of the integral sheet metal body to prevent axial movement of the housing in onedirection with respect to the side wall.

In one embodiment of the invention, the integral body defining the support comprises a spaced pair of side walls extending from the top portion, and the end portions extend between the spaced side walls. Each side wall is formed with an actuator opening for receiving the module, and one side wall is formed with a mounting leg for mounting the integral body on a vehicle frame in such a position as to receive the disk brake between the spaced side walls.

In another embodiment, the integral body forming the support for the actuator module is of the type that is slidably mounted on the vehicle such that actuation of the brakes causes the actuator support to move with respect to the actuator so that the actuator presses one brake pad against one surface of the disk, and the caliper or support moves to press another brake pad against the opposite surface of the disk.

In still another embodiment, the integral body defining the actuator support is constructed to cooperate with a similarily constructed support forming a portion of the steering knuckle at the front wheel of the vehicle.

Other objects, advantages and features of the invention will become apparent from the following description taken in connection with the accompanying drawings in which.

Figure 1:
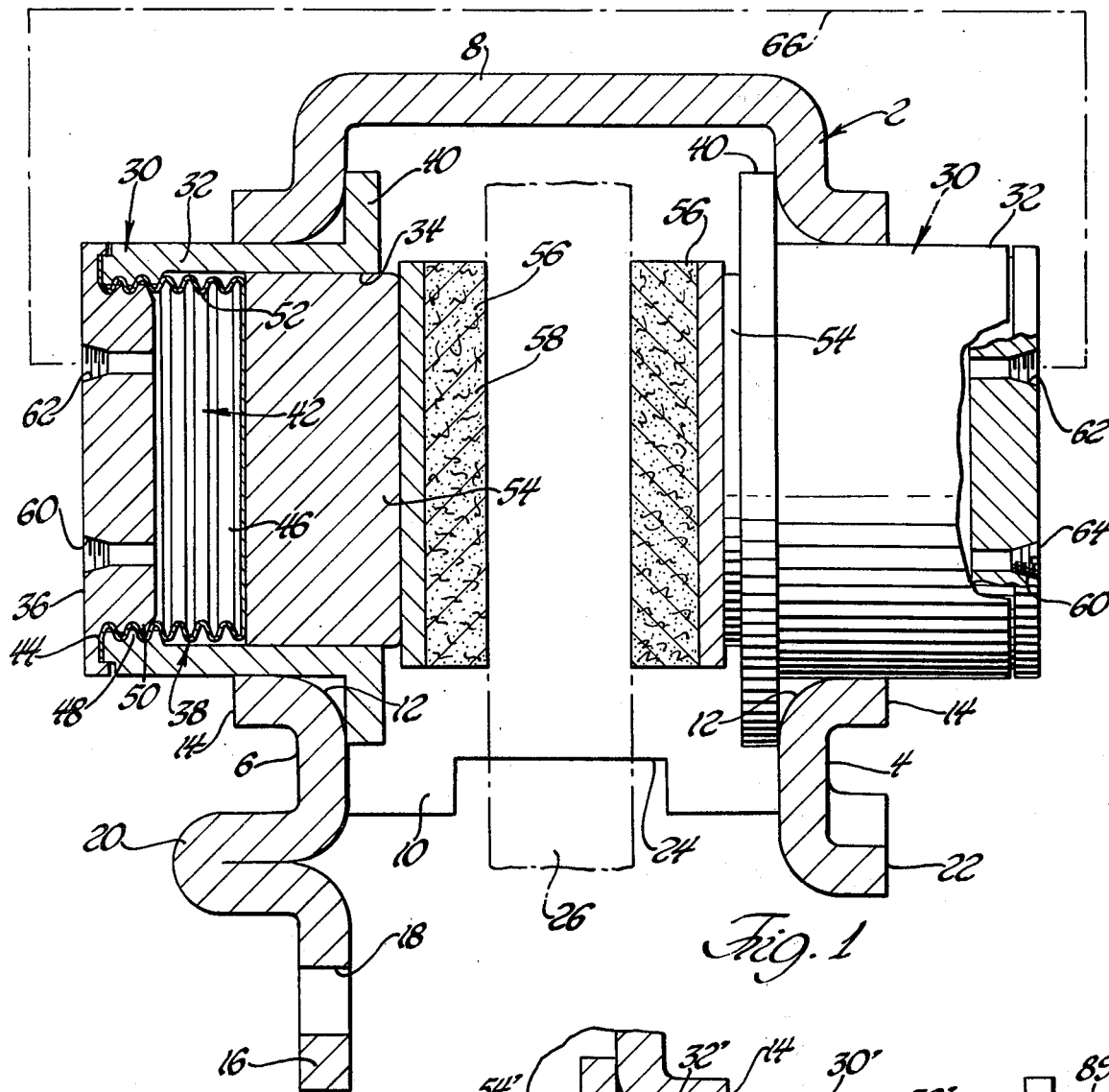
FIG. 1 is a sectional view of rear wheel disk brake assembly of the fixed type embodying the present invention.

In FIG. 1, reference numeral 2 collectively designates a disk brake actuator support or caliper in the form of an integral body of stamped sheet metal. The integral body may be stamped or forged from sheet steel of, for example, one quarter inch thickness. The sheet metal body includes a pair of spaced, flat side walls 4 and 6 with a top portion 8 projecting between the top edges of the side walls 4 and 6 and a pair of end portions 10 (only one such end portion can be visible in FIG. 1) projecting between the end edges of the side walls 4 and 6 and depending integrally from the ends of the top portion 8.

The side walls 4 and 6 are formed with actuator openings 12 which are in axial alignment with each other. A flange projects from the periphery of and surrounds each of the openings 12 to define an integral sleeve 14 for axially receiving a disk brake actuator assembly.

Depending from the side wall 6 is a mounting leg 16 formed with one or more mounting holes 18 for mounting the support 2 on a vehicle frame member. The mounting leg 16 is formed intermediate its ends with a stiffening rib or bead in the form of a reverse bend 20.

A stiffening flange 22 projects outwardly from the lower end of the side wall 4, and notches 24 are formed in the lower edges of the end portions 10 to provide clearance for a conventional brake disc 26 indicated in phantom lines in FIG. 1.

Axially received in each of the openings 12 and supported in the sleeves 14 is a hydraulic disk brake actuator module indicated collectively by reference numeral 30. Each of the modules 30 includes a cylindrical housing 32 having a open end 34 and a closed end defined by a closure plate 36. An actuator 38 is mounted in the cylindrical housing 32 and is responsive to changes in hydraulic pressure to extend and retract with respect to the housing. The housing 32 is received in the sleeve 14 with a friction fit and is formed with a retaining flange 40 projecting outwardly from the open end of the housing and engaging the inner surfaces of the respective side walls 4 and 6 to prevent axial outward movement of the housings 32 with respect to the side walls 4 and 6.

In the illustrated embodiment, the actuator 38 is in the form of a fluid pressure transmitting member mounted in the housing and forming with the housing a fluid pressure chamber 42. The fluid pressure transmitting member comprises an extendable and retractable cup-like actuator having an opened end portion defined by an outwardly projecting flange 44 and a closed end portion 46. The flange 44 is secured in fixed, fluid tight relationship with the housing 32 by the closure plate 36. The closure plate 36 and inner side wall of the housing 32 are formed with cooperating threads or serrations 50, 48, respectively, with a portion of the side wall of the actuator 38 received in fluid tight relationship between the cooperating threads 48 and 50. Consequently, the closed end portion 46 of the actuator defines a pressure responsive movable wall for the pressure chamber 42 and is operable to extend toward the disk 26 to apply braking pressure when fluid pressure is applied to the chamber 42. Also axially received in the cylindrical housing 32 is piston member 54 the outer end of which engages a brake pad 56 and the inner end of which engages the closed end portion 46 of the actuator 38. The piston member 54 is in slidable, non-sealing relationship with the inner cylindrical wall of the housing 32 since the brake fluid is separated from the piston 54 by the actuator 38. When braking pressure is applied to the chamber 42, the actuator 38 extends toward the disk 26, which movement in turn causes the piston 54 to extend and press the brake lining material 58 of the brake pad 56 against the disk 26.

The actuator 38 is formed with an endless side wall 52 which extends between the open end portion defined by the flange 44 and the closed end portion 46. The side wall 52 is corrugated and is formed with a material that is plastically deformable in response to the application of pressure to the chamber 42 to prevent the side wall 52 from returning to its original length when the pressure is subsequently relaxed so that the relaxed length of the actuator 38 changes progressively with successive application and relaxation of pressure to the chamber. Consequently, as the brake lining material 58 wears through use, the relaxed length of the side wall 52, and hence of the actuator 38, progressively increases to compensate for the wear. The specific constructin and operation of the actuator 38 is disclosed and claimed in the above-mentioned copending application of the inventor, Ser. No. 23699, and forms no part of the present invention except as employed in the over all combination of the support member 2 and the actuator module 30. It is also within the scope of the present invention, that instead of actuators 38 of the closed circuit, bellows-type as illustrated in FIG. 1, conventional pistons having a sliding sealing relationship with the wall of the housing 32 be employed to provide braking pressure to the brake pads 56. Consequently, as used herein and in the claims, the term "actuator" refers to both pistons and bellows type actuators unless otherwise specified.

The closure plate 36 of each of the actuators 30 are formed with inlet and outlet openings 60 and 62, respectively, communicating with the chamber 42. The inlet 60 of the left hand module 30 is connected with a source of hydraulic brake fluid through a master cylinder (not shown), and the outlet 62 is connected through a hydraulic line 66 with the inlet 62 of the right hand module 30. The opening 64 in the right hand module 30 is closed by a bleed screw 64. The chambers 42 of both the left hand and right hand modules 30 in FIG. 1 are initially filled with a "solid" fluid such as silicon grease in order to remove all air within the chambers 42, that is, all of the spaces within the chambers 42 in their fully retracted positions are filled with the grease. The bleed screw 64 in the right hand module is then removed, and brake fluid is forced through the system from the inlet 60 of the left hand module 30, through the grease filled chamber 42 to the outlet 62 of the left hand module 30, and through the line 66 to the right hand module 30. When the fluid flows through the bleed opening 60 in the right hand module, the screw 64 is placed in the bleed opening and the system is closed while the brake fluid is under pressure so that no air is trapped in the system.

Figure 2:
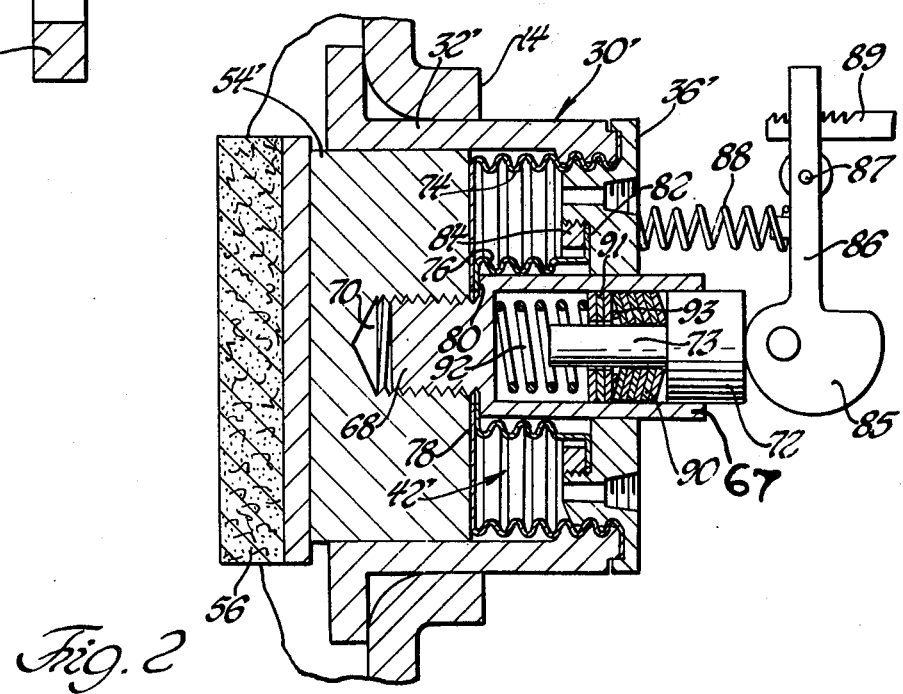
FIG. 2 is a sectional view of a disk brake assembly having a parking brake mechanism attached thereto and embodying the present invention.

FIG. 2 illustrates a modification of the construction of the brake actuator module in which a parking brake mechanism is mounted in the housing of the module and is operable to apply braking pressure through the movable wall of the pressure chamber independently of the pressure in the pressure chamber. In FIG. 2, the module is collectively designated by reference numeral 30' having a closure plate 36', a piston member 54', and a closure plate 36' with a pressure chamber 42' defined between the closure plate and piston 54'. The parking brake mechanism includes a cylinder 67 axially slidably mounted in the closed end wall 36' of the housing 32' and fixed to the piston 54'. The cylinder 67 has a threaded shank 68 which is received in a threaded hole 70 formed in the piston 54'.

Slidably mounted in the cylinder 67 is a piston 72. The piston 72 projects from the open end of the cylinder 67 and engages an operating member 85.

In the FIG. 2 embodiment, the pressure chamber 42' is defined by an actuator having an outer, corrugated side wall 74, and an inner corrugated side wall 76. The side wall 74 and 76 have end portions 78 and 80, respectively, which are clamped between the piston 54' and the shoulder formed by the cylinder 67 at its junction with the shank 68.

The inner corrugated side wall 76 has an open end portion with an outwardly projecting flange 82 which is clamped between the inner surface of the end plate 36' and a retaining ring 84 threadedly secured to the end plate 36'.

The operating member 85 is formed with a lever arm 86 which is pivotally mounted at 87 on a portion of the vehicle frame. The operating member 85 is biased into engagement with the piston 72 by a spring 88 connected between the end plate 36' and lever arm 86. The configuration of the operating member 85 is such that clockwise rotation of the lever arm 86 about the pin 87 as viewed in FIG. 2 causes a progressively increasing amount of axial movement toward the left of the piston 72. The lever arm 86 is connected adjacent its outer end on the side of the pivot point 87 opposite the operating member 85 with a ratchet member 89, the ratchet member 89 in turn being connected with a hand brake lever. The ratchet member 89 can move relative to the lever arm 86 in a direction toward the left as viewed in FIG. 2, but cannot move with respect to lever arm 86 in a direction toward the right. Therefore, a force through the ratchet member 86 toward the right as viewed in FIG. 2 causes clockwise pivotal movement of the operating member 85 about the pivot point 87 to in turn cause piston 72 to move toward the left.

The piston 72 has a rod of smaller diameter than the piston which extends axially into the cylinder 67. Received on the rod 73 is a plurality (6 in the illustrated embodiment of FIG. 2) of bowed Belleville dished washers 90. The dished washers 90 have a central aperture which received the rod 73, and are arranged such that the central portion of each of the washers in its unstressed condition is located adjacent the inner surface of the piston 72 with the outer periphery extending away from the piston 72, or toward the left in FIG. 2. The outer peripheral edges of the spring washers 90 are slidably engaged with the inner wall of the cylinder 67 and extend away from the piston 72, or toward the left as viewed in FIG. 2. A plurality of flat washers 91 (three such flat washers being illustrated in FIG. 2) are received on the piston rod 73 on the opposite sides of the spring washers 90 from the piston 72. Seated between the flat washers 91 and the end wall of the cylinder is a spring 92 which biases the washers 91, 90 and piston rod 72 toward the right as viewed in FIG. 2. A ring 93 is received between the washers 90 and 91 for urging the central portions of the spring washers 90 toward the unstressed condition as illustrated in FIG. 2.

When the operating member 85 is caused to pivot in a clockwise direction about the pin 87, the piston 72 responds by moving toward the left. However, the resistance of the spring 92 is sufficient to cause the spring washers 90 to tend to flatten out. Consequently, the outer peripheries of the spring washers 90 frictionally engage the wall of the piston 67 and do not move axially with respect to the piston 72. Consequently, the cylinder 67 and piston 54' are carried to the left with the piston 72 because of the frictional engagement between the outer peripheries of the spring washers 90 and the inner surface of the cylinder 67. However, when the parking brake is released to cause the operating member 85 to return to a neutral, unstressed position, the spring 92 urges the washers 90, and hence the piston 72 toward the right with respect to the cylinder 67 to maintain the piston 72 in contact with the cam surface of the operating member 85. Since the relaxed length of the side walls 74 and 76 progressively increase to compensate for wear on the brake lining 58, the piston 72 projects further from the cylinder 67 a corresponding distance so that the piston 72 is always maintained in engagement with the operating member 85, even though the unstressed, or unpressurized position of the piston 54' changes.

Figure 3:
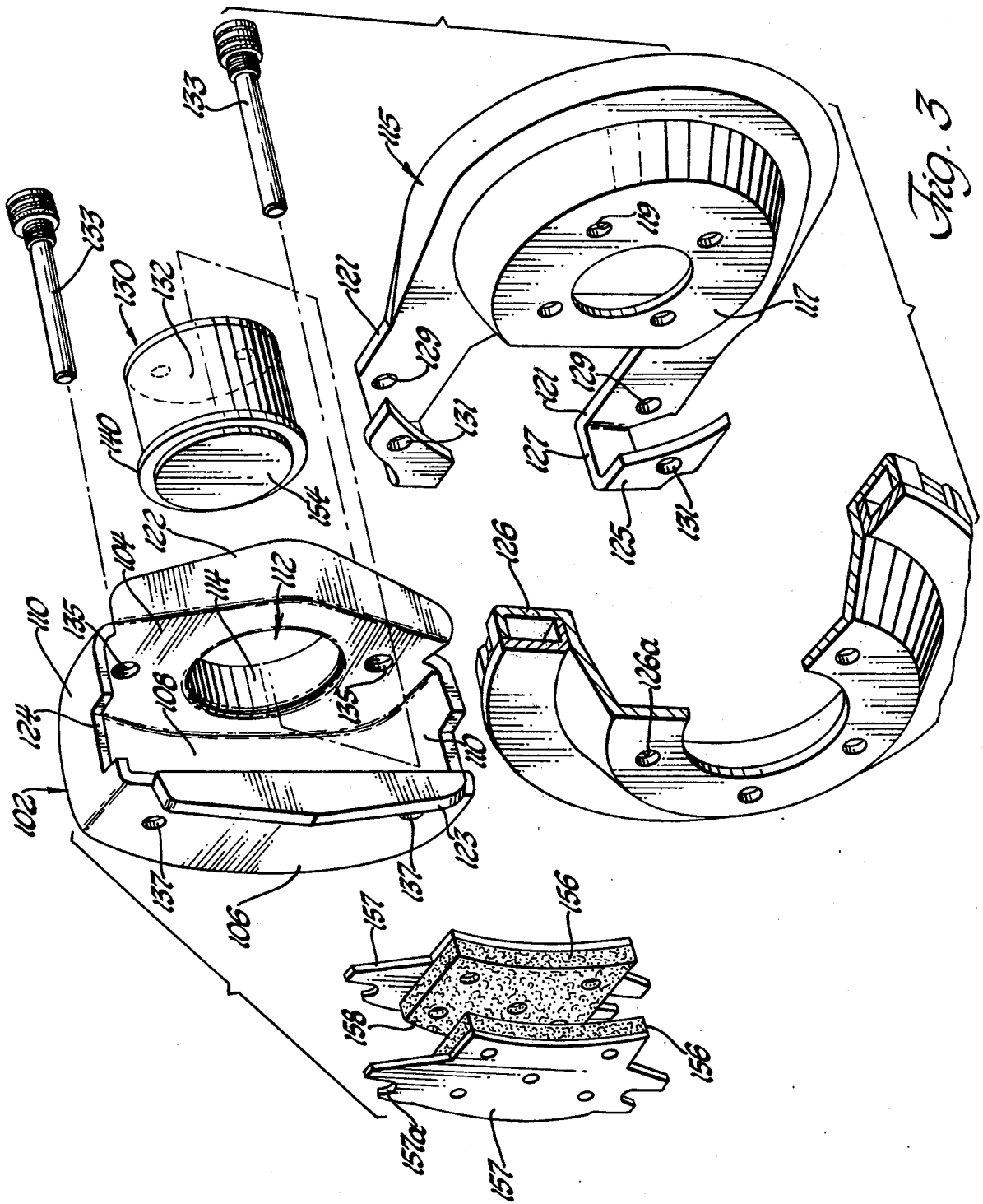
FIG. 3 is an exploded perspective view of a rear wheel disk brake assembly having a sliding caliper or support.

In FIG. 3, the invention is embodied in a disk brake assembly of the type in which the support or caliper is supported for slidable movement with respect to the disk. In FIG. 3, reference numeral 102 collectively designates the support or caliper which, like the embodiment of FIG. 1, comprises an integral body of stamped sheet metal. The body 102 has spaced, parallel side walls 104 and 106 with a top portion 108 extending between the upper edges of the side walls 104 and 106, and end portions 110 extending between the end edges of the side walls 104 and 106, the end portions 110 also being integral with and depending from the end edges of the top portion 108. One side wall 104, only, is formed with an actuator opening 112. A flange 114 projects outwardly from the periphery of the opening 112 and defines an integral sleeve for axially receiving a disk brake module 130 which, in the illustrated embodiment, is of a construction that is identical to the module 30 of FIG. 1. Stiffening flanges 122 and 123 project outwardly from the lower edges of the side walls 104 and 106, respectively. Notches 124 are formed in the lower edges of the end portions 110 for receiving the edge of the brake disk 126.

The caliper 102 is slidably supported on an attachment member 115. The specific construction of the attachment member 115, as well as the construction of the disk 126, form no part of the present invention. The attachment member 115 illustrated in FIG. 3 includes a central, recessed portion 117 which is formed with mounting openings 119 for securing the attachment member 115 to a fixed portion of the frame of the vehicle. The attachment member 115 includes a pair of upwardly projecting arms 121. A support leg 125 is joined to the upper end of each arm 121 by a connecting portion 127. Coaxial openings 129 and 131 are formed in the arms 121 and legs 125, respectively. The two pairs of openings 129, 131 receive guide pins or bolts 133. Formed in the side wall 104 on diametrically opposite sides of the opening 112 is a pair of holes 135. A pair of holes 137, each in coaxial alignment with one of the holes 135, is formed in the side wall 106.

When assembled together, the attachment member is secured through the holes 119 to a stationary portion of the vehicle, while the rotor 126 is secured through holes 126a to the axle or wheel or some other part that rotates with the wheel of the vehicle. The arms 121, legs 125 and connector 127 of the attachment member 115 are received within the support housing 102 between the side walls 104 and 106 with each aligned set of holes 135 and 137 aligned with a set of holes 129 and 131. The guide pins 133 are received in each set of aligned holes 135, 129, 131 and 137 such that the support housing 102 is slidable along the axes of the pins 133 with respect to the attachment member 115.

The disk 126 projects into the support housing 102 with a portion of its circumference received in the notches 124, and brake pads 156 are engageable with opposite sides of the rotor 126. The brake pads 156 include backing plates 157 having a pair of mounting grooves 157a formed at the opposite ends for slidably mounting the brake pads 156 onto the guide pins 133. The right hand brake pad 156 is engaged by the piston 154 of the actuator module 130, while the left hand brake pad 156 is engaged by the inner surface of the side wall 106. When the module 130 is mounted in the opening 112 with the retaining flange 140 engaged with the inner surface of the side wall 104, extension of the actuator within the module 130, and the corresponding extension of piston 154 from the actuator housing 132, causes the right hand brake pad 156 to engage the right hand surface of the disk 126, after which the support housing 102 is caused to move to the right along the axes of the guide pins 133 because of the engagement of the retaining flange 140 with the inner surface of the side wall 104 as the piston 154 continues to extend from the actuator housing 132. The support housing 102 continues to move to the right until the left hand brake pad 156 engages the left hand surface of the disk 126.

Figure 4:
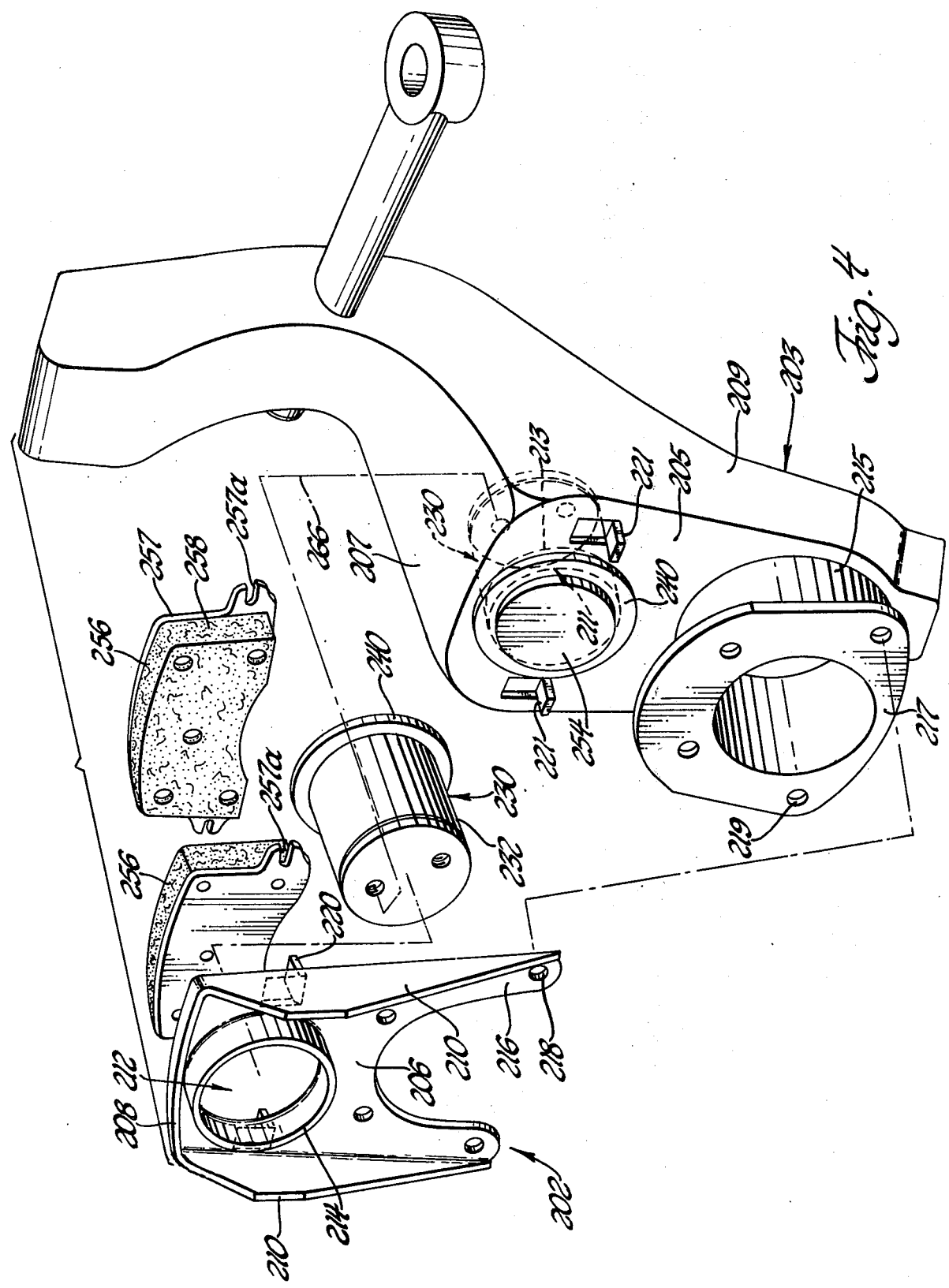
FIG. 4 is an exploded perspective view of a front wheel disk brake assembly embodying the present invention.

FIG. 4 illustrates the invention embodied in a front wheel steering knuckle assembly. The support for the disk brakes in FIG. 4 are provided by a two part assembly, one part consisting of the steering knuckle. One part of the support is indicated collectively by reference numeral 202 in FIG. 4, and the other part is indicated collectively by reference numeral 203, reference numeral 203 indicating the steering knuckle portion of the assembly.

The actuator support portion 202 in FIG. 4 comprises an integral body of stamped sheet metal having a substantially flat side wall 206, a top portion 208 projecting from the top edge of the side wall, and a pair of end portions 210 projecting from the end edges of the side wall. The end edges 210 depend from the ends of the top portions in such that the top portion 208 extends between the upper ends of the upper end portions 210. An actuator opening 212 is formed in the side wall 206, with a flange 214 projecting from the periphery of and surrounding the opening 212 to define an integral sleeve for axially receiving a disk brake actuator module 230. The module 230 may be of identical construction to the module 30 of FIG. 1 and the module 130 of FIG. 3.

The steering knuckle portion of the disk brake support includes an integral body of stamped sheet metal having a flat side wall 205, a top portion 207 projecting from the top edge of the side wall, and a pair of end portions 209 (only one being visible in the drawing) projecting from the end edges of the side wall 205 and depending integrally from the ends of the top portion 207. An actuator opening 211 is formed in the side wall 205, with a flange 213 projecting from the periphery of and surrounding the opening 211 to define an integral sleeve for axially supporting a disk brake actuator module 230.

Projecting from the side wall 205 is a cylindrical shaft 215 having a mounting flange 217 formed on its end opposite the side wall 205. Mounting holes 219 are formed in the mounting flange 217. The support portion 202 is formed with a pair of legs 216 depending from the side wall 206, and plurality of holes 218 are formed in the legs 216 and lower portion of the side wall 206. The holes 218 can be aligned with the holes 219 for receiving fastners to attach the number 202 with the mounting flange 217 in such a manner that the openings 211 and 212 are in coaxial alignment with each other.

A pair of brake pad mounting tabs 220 are struck from the side wall 206 on diametrically opposite sides of the opening 212. Similarily, a pair of brake pads mounting tabs 221 are struck from the side wall 205 on diametrically opposite sides of the opening 211. When the support housing portion 202 is secured to the mounting flange 217, the left hand brake pad 256 in FIG. 4 is slidably mounted on tabs 220 and the right hand brake pad 256 is slidably mounted on the tabs 221. Plates 257 of the brake pad 256 are each formed with slots 257a for receiving the mounting tabs 220, 221.

The modules 230 are mounted in the respective portions 202 and 203 of the assembly in opposed relatinship, and the disk (not shown) is received between the pair of brake pads 256 so that, when the actuators of the respective modules 230 are simultaneously pressurized, the pistons 254 extend from the respective actuators to cause the brake pads to engage opposite sides of the disk. The disk rotates about the axis of the shaft 215.

The hydraulic connections between the two modules 230 may include a flexible hydraulic line 266 in a manner similar to the manner in which the modules 30 are connected together in FIG. 1.

While several specific forms of the invention have been described in the foregoing specification and illustrated in the accompanying drawings, it should be understood that the invention is not limited to the exact construction shown. On the contrary, various alterations in the construction and arrangement of parts, all falling within the scope and spirit of the invention, will be apparent to those skilled in the art.

The embodiments of the present invention in which an exclusive property or privilege is claimed are defined as follows:

1. Disc brake apparatus comprising: an actuator support including an integral body of stamped sheet metal of uniform thickness having a pair of spaced, substantially flat side walls, a top portion extending between the top edges of said side walls, a pair of end portions each extending between the end edges of said spaced pair of side walls at opposite ends of said top portion such that said top portion extends between the upper ends of said end portions, a stiffening flange projecting outwardly from the lower edge of at least one of said side walls, an actuator opening formed in at least one of said side walls, an integral flange struck from said one side wall and projecting from the periphery of and surrounding said opening to define an integral sleeve having an outwadly projecting cylindrical wall for axially receiving a disc brak actuator assembly, a disc brake actuator module received in said actuator opening and sleeve and supported by the cylindrical wall of said sleeve, said module comprising a cylindrical housing having a closed end and an open end with an actuator mounted therein and axially extendable and retractable with respect to said housing in response to fluid pressure changes in said housing, said housing being received in said sleeve with a friction fit and being formed with a retaining flange projecting outwardly from one end of said housing and engaging said side wall to prevent axial movement of said housing in one direction with respect to said side wall.

2. Apparatus as claimed in claim 1 including a mounting leg depending from the other said side walls for mounting said body on a vehicle frame.

3. Apparatus as claimed in claim 2 including a reverse bend formed in said mounting leg.

4. Apparatus as claimed in claim 3 including a notch formed in each end portion for receiving a brake disc.

5. Apparatus as claimed in claim 1 wherein an actuator opening is formed in the other of said side walls in coaxial alignment with the actuator opening in said one side wall, and wherein a flange projects from the periphery of and surrounds the opening in said other side wall to define an integral sleeve having an outwardly projecting cylindrical wall in said other side wall for axially receiving a disc brake actuator, a second disc brake actuator module received in the actuator opening and sleeve of said other side wall, said second module being disposed in opposed relationship with the module in said one side wall and comprising a cylindrical housing having a closed end and an open end with an actuator mounted therein and axially extendable and retractable with respect to said housing in response to fluid pressure changes in said housing, said housing being received in its respective sleeve with a friction fit and being formed with a retaining flange projecting outwardly from one end of said housing and engaging said other side wall to prevent axial movement of said housing in one direction with respect to said other side wall.

6. Apparatus as claimed in claim 1 wherein said actuator comprises a fluid pressure transmitting member mounted in said housing and forming with said housing a fluid pressure chamber, said fluid pressure transmitting member comprising an extendable and retractable cup-like actuator having an open end portion and a closed end portion; means securing said open end portion in fixed, fluid-tight relationship with the closed end of said housing such that said closed end portion of said actuator defines a pressure responsive movable wall for said chamber and is operable to apply braking pressure when fluid pressure is applied to said chamber.

7. Apparatus as claimed in claim 6 wherein said actuator further comprises an endless side wall extending between said open and closed end portions; said side wall being formed with at least one deformable corrugated segment for changing the length of said side wall and hence the spacing between said open and closed end portions, said corrugated segment being plastically deformable in response to application of pressure to said chamber to prevent the side wall from returing to its original length when the pressure is subsequently relaxed so that the relaxed length of the actuator changes progressively with the successive application and relaxation of pressure to said chamber.

8. Disc brake apparatus comprising: an actuator support including an integral body of stamped sheet metal of uniform thickness having a pair of spaced, substantially flat side walls, a top portion extending between the top edges of said side walls, a pair of end portions each extending between the end edges of said spaced pair of side walls at opposite ends of said top portion such that said top portion extends between the upper ends of said end portions, a stiffening flange projecting outwardly from the lower edge of at least one of said side walls, an actuator opening formed in at least one of said side walls, an integral flange struck from said one side wall and projecting from the periphery of and surrounding said opening to define an integral sleeve for axially receiving a disc brake actuator assembly, a disc brake actuator module received in said actuator opening and sleeve said module comprising a cylindrical housing having a closed end and an open end with an actuator mounted therein and axially extendable and retractable with respect to said housing in response to fluid pressure changes in said housing, said housing being received in said sleeve with a friction file and being formed with a retaining flange projecting inwardly from one end of said housing and engaging said side wall to prevent axial movement of said housing in one direction with respect to said side wall; wherein said actuator comprises a fluid pressure transmitting member mounted in said housing and forming with said housing a fluid pressure chamber, said fluid pressure transmitting member comprising an extendable and retractable cup-like actuator having an open end portion and a closed end portion; means securing said open end portion in fixed, fluid-tight relationship with the closed end of said housing such that said closed end portion of said actuator defines a pressure responsive movable wall for said chamber and is operable to apply braking pressure when fluid pressure is applied to said chamber; wherein said actuator further comprises an endless side wall extending between said open and closed end portions; said side wall being formed with at least one deformable corrugated segment for changing the length of said side wall and hence the spacing between said open and closed end portions, said corrugated segment being plastically deformable in response to application of pressure to said chamber to prevent the side wall from returning to its original length when the pressure is subsequently relaxed so that the relaxed length of the actuator changes progressively with the successive application and relaxation of pressure to said chamber; further including parking brake means mounted in said housing operable to apply braking pressure through said movable wall independently of the pressure in said pressure chamber.

9. Apparatus as claimed in claim 8 wherein said parking brake means comprises a cylinder axially slidably mounted in the closed end wall of said housing and fixed to the closed end portion of said actuator, a piston slidably mounted in said cylinder and projecting from said housing; operating means engageable with said piston and movable in one direction to actuate said piston toward said housing and movable in the opposite direction to permit said piston to extend from said housing; and stop means in said cylinder operable to prevent movement of said piston relative to said cylinder in said one direction so that movement of said piston in said one direction causes movement of said movable wall in the brake pressure applying direction, and return spring means in said cylinder operable to cause said piston to follow said operating means and remain in contact therewith upon movement of said operating means in said opposite direction.

10. Apparatus as claimed in claim 9 wherein said stop means comprises at least one dished spring washer received in said cylinder having its central portion engaged with said piston and its outer periphery extending away from said piston and slidably engaged with the wall of said cylinder such that movement of said piston in said one direction causes said outer periphery to frictionally engage the cylinder wall and cause the cylinder to move with said piston in said one direction.

11. Disc brake apparatus comprising: an integral body of stamped sheet metal of uniform thickness having at least one substantially flat side wall, a top portion projecting from the top edge of said side wall, a pair of end portions projecting from the end edges of said side wall and depending integrally from the ends of said top portions such that said top portion extends between the upper ends of said end portions, an actuator opening formed in said side wall, a flange projecting from the periphery of said opening in the same direction as said top and end portions and surrounding said opening to define an integral sleeve for axially receiving a disc brake actuator assembly, a pair of brake pad mounting tabs struck from said side wall on diametrically opposite sides of said opening and projecting in the opposite direction from said sleeve, a disc brake actuator module received in said opening and sleeve, said module comprising a cylindrical housing having a closed end and an open end with an actuator mounted therein and axially extendable and retractable with respect to said housing in response to fluid pressure changes in said housing, said housing being received in said sleeve with a friction fit and being formed with a retaining flange projecting outwardly from one end of said housing and engaging said side wall to prevent axial movement of said housing in one direction with respect to said side wall.

12. Disc brake apparatus comprising: an actuator support including an integral body of stamped sheet metal of uniform thickness having a pair of spaced, substantially flat side walls, a top portion extending between the top edges of said side walls, a pair of end portions each extending between the end edges of said spaced pair of sidewalls at opposite ends of said top portion such that said top portion extends between the upper ends of said end portions, a stiffening flange projecting outwardly from the lower edge of at least one of said side walls, an actuator opening formed in at least one of said side wals, an integral flange struck from said one side wall and projecting from the periphery of and surrounding said opening to define an integral sleeve having an outwardly projecting cylindrical wall for axially receiving a disc brake actuator assembly, a disc brake actuator module received in said actuator opening and sleeve and supported by the cylindrical wall of said sleeve, said module comprising a cylindrical housing having a closed end and an open end with an actuator mounted therein and axially extendable and retractable with respect to said housing in response to fluid pressure changes in said housing, said housing being received in said sleeve with a friction fit and being formed with a retaining flange projecting outwardly from one end of said housing and engaging said side wall to prevent axial movement of said housing in one direction with respect to said side wall; and wherein an actuator opening is formed in the other of said side walls in coaxial alignment with the actuator opening in said one side wall, and wherein a flange projects from the periphery of and surrounds the opening in said other side wall to define an integral sleeve having an outwardly projecting cylindrical wall in said other side wall for axially receiving a disc brake actuator, a second disc brake actuator module received in the actuator opening and sleeve of said other side wall, said second module being disposed in opposed relationship with the module in said one side wall and comprising a cylindrical housing having a closed end and an open end with an actuator mounted therein and axially extendable and retractable with respect to said housing in response to fluid pressure changes in said housing, said housing being received in its respective sleeve with a friction fit and being formed with a retaining flange projecting outwardly from one end of said housing and engaging said other side wall to prevent axial movement of said housing in one direction with respect to said other side wall.

13. Apparatus as claimed in claim 12 including a mounting leg depending from the other of said side walls for mounting said body on a vehicle frame.

14. Apparatus as claimed in claim 13 including a reverse bend formed in said mounting leg.

15. Apparatus as claimed in claim 14 including a notch formed in each end portion for receiving a brake disc.

* * * * *